US011762725B2

(12) United States Patent
Fusco et al.

(10) Patent No.: US 11,762,725 B2
(45) Date of Patent: Sep. 19, 2023

(54) DETECTING AND MANAGING LOSSES OF EVENT DATASETS IN A COMPUTING NETWORK

(71) Applicant: Red Hat, Inc., Raleigh, NC (US)

(72) Inventors: Mario Fusco, Gorgonzola MI (IT); Francesco Nigro, Milan (IT)

(73) Assignee: RED HAT, INC., Raleigh, NC (US)

(*) Notice: Subject to any disclaimer, the term of this patent is extended or adjusted under 35 U.S.C. 154(b) by 222 days.

(21) Appl. No.: 16/846,721

(22) Filed: Apr. 13, 2020

(65) Prior Publication Data
US 2021/0318925 A1 Oct. 14, 2021

(51) Int. Cl.
| G06F 11/00 | (2006.01) |
| G06F 11/07 | (2006.01) |
| G16Y 20/20 | (2020.01) |
| G06F 9/54 | (2006.01) |
| G06F 11/30 | (2006.01) |

(52) U.S. Cl.
CPC .......... *G06F 11/0772* (2013.01); *G06F 9/542* (2013.01); *G06F 9/544* (2013.01); *G06F 11/0787* (2013.01); *G06F 11/3013* (2013.01); *G16Y 20/20* (2020.01)

(58) Field of Classification Search
CPC ............. G06F 11/0772; G06F 11/0745; G06F 11/0793; G06F 11/3013
See application file for complete search history.

(56) References Cited

U.S. PATENT DOCUMENTS

| 6,408,409 | B1* | 6/2002 | Williams | .................. G06F 5/10 |
| | | | | 714/719 |
| 8,341,279 | B2* | 12/2012 | Thubert | .................. H04W 4/38 |
| | | | | 709/230 |
| 10,097,404 | B2 | 10/2018 | Yadav et al. | |
| 2003/0093662 | A1* | 5/2003 | Vorbach | .............. G06F 15/7867 |
| | | | | 712/E9.016 |
| 2009/0187682 | A1* | 7/2009 | Arndt | .................. G06F 13/4059 |
| | | | | 710/57 |
| 2018/0203481 | A1* | 7/2018 | Chen | ..................... H04J 3/0661 |

(Continued)

OTHER PUBLICATIONS

Gupchup J., et al., "Trustworthy Experimentation Under Telemetry Loss," Microsoft Outreach.io, Jan. 22, 2019, https://arxiv.org/pdf/1903.12470.pdf.

(Continued)

*Primary Examiner* — Philip Guyton
(74) *Attorney, Agent, or Firm* — Kilpatrick Townsend & Stockton LLP (57) ABSTRACT

Losses of event datasets in computing networks can be detected and managed according to some examples. One example can include a system that can identify a slot among a group of slots of a ring buffer in which to store an event dataset. The system can determine a sequence number to associate with the event dataset. The system can then write the sequence number in a first predefined area of the slot of the ring buffer. Additionally, the system can initiate a write process for writing the event dataset in a second predefined area of the slot of the ring buffer, the second predefined area being separate from the first predefined area. The system can detect a completion of the write process and, in response to detecting the completion of the write process, include a write-completion indicator in the first predefined area.

20 Claims, 4 Drawing Sheets

(56) References Cited

U.S. PATENT DOCUMENTS

| | | |
|---|---|---|
| 2019/0238633 A1 | 8/2019 | Rao et al. |
| 2019/0372877 A1 | 12/2019 | Nainar et al. |
| 2021/0007071 A1* | 1/2021 | Peter ........................ H04W 4/46 |
| 2021/0318925 A1* | 10/2021 | Fusco ..................... G06F 9/544 |

OTHER PUBLICATIONS

Marques, J.A., et al., "An Optimization-Based Approach for Efficient Network Monitoring Using In-Brand Network Telemetry," Journal of Internet Services and Applications, 2019, https://jisajournal.springeropen.com/articles/10.1186/s13174-019-0112-0.

Michel, O., "Packet-Level Network Telemetry and Analytics," University of Colorado, 2019, https://eric-keller.github.io/thesis/OliverMichel-dissertation 4 2019.pdf.

Song, H., et al., "In-situ Flow Information Telemetry," Futurewei, et al., Nov. 19, 2019, https://tools.ietf.org/id/draft-song-opsawg-ifit-framework-08.html.

"Stream Traffic," Elsevier B.V., 2020, https://www.sciencedirect.com/topics/computer-science/stream-traffic.

* cited by examiner

DETECTING AND MANAGING LOSSES OF EVENT DATASETS IN A COMPUTING NETWORK

TECHNICAL FIELD

The present disclosure relates generally to detecting and managing data losses in a computing network. More specifically, but not by way of limitation, this disclosure relates to detecting and managing losses of event datasets in a computing network.

BACKGROUND

The recent proliferation of Internet-connected devices, such as smart watches, wearables, and Internet-of-Things (IOT) devices, has dramatically increased the number of interconnected devices communicating with one another over computing networks. Such communications generally originate from a provider device and are triggered by events. An event is a predefined condition that triggers a provider device to convey (e.g., over a network) information to one or more recipient devices. As one particular example, a smart temperature sensor may serve as a provider device that only reports a temperature measurement to a recipient device in response to detecting a certain event, such as a temperature of the sensor's surrounding environment exceeding a predefined threshold. This may generate much less network traffic than, for example, the smart temperature sensor continuously reporting temperature measurements at a periodic interval to the recipient device.

DETAILED DESCRIPTION

In a typical network arrangement, a producer device can convey information about detected events to one or more recipient devices. This information is referred to herein as an event dataset. Often, the producer device conveys event datasets to the recipient devices via a bounded queue. A bounded queue is a first-in-first-out (FIFO) queue with a fixed capacity. As the producer device detects events, the producer device writes the corresponding event datasets to the bounded queue for retrieval by the recipient devices. But mismatches between how fast the producer device writes event datasets to the bounded queue and how fast the recipient devices read the event datasets from the bounded queue can lead to a variety of problems. For example, if the producer device writes event datasets to the bounded queue faster than the recipient devices can read them, some of the event datasets in the bounded queue may be overwritten by the producer device before the recipient devices can read them. One way to reduce such data loss is to throttle the producer device's writes to the bounded queue, so that the recipient devices have time to catch up. For example, writing to the bounded queue can be paused so that the recipient devices are able to read the event datasets that may otherwise be overwritten by the provider device. But this increases latency and puts additional onus on the producer device, and the event datasets present in the bounded queue may be outdated by the time the recipient devices have caught up. Alternatively, if the recipient devices read event datasets from the bounded queue at a faster rate than the producer device can write them, the recipient devices may retrieve incomplete event datasets.

Some examples of the present disclosure can overcome one or more of the abovementioned problems via a producer device that can write a respective sequence number to a ring buffer in conjunction with each respective event dataset. A sequence number is a numerical value in a successive sequence of ordered numerical values, where each sequence number differs from the next number in the sequence by a predefined sequence interval. The sequence numbers stored in the ring buffer can be used by recipient devices to determine if, and how much, data loss has occurred. Depending on how much data loss has occurred, the recipient device may then take corrective action. This can take the onus off the producer device to mitigate data loss, decrease the latency of the system, and help ensure that the recipient devices are receiving the most up-to-date event datasets.

As one specific example, a system can include a producer device and a recipient device. The producer device can detect an event and responsively initiate a process to write an event dataset associated with the event to a slot of a ring buffer. As part of the process, the producer device can determine a current value of a counter stored in memory and use the current value as the sequence number for the event dataset. The producer device can then write the sequence number for the event dataset to a first predefined area of the slot of the ring buffer. After writing the sequence number to the first predefined area, the producer device can increment the counter to generate the next sequence number for use with the next event dataset. Additionally, the producer device can initiate a write process for writing the event dataset to a second predefined area of the slot in the ring buffer, where the second predefined area is separate from the first predefined area. The write process may take more or less time depending on the size of the event dataset. Upon completing the write process, the producer device can incorporate a write-completion indicator into the first predefined area of the slot. A write-completion indicator is an indicator that a write process is complete. One example of the write-completion indicator can include the incremented counter value. The producer device can repeat this process for each event dataset that it adds to the ring buffer.

As the producer device writes to the ring buffer, the recipient device can also read from the ring buffer. For example, the recipient device can receive an event dataset and a corresponding sequence number from a slot of the ring buffer. The recipient device can then compare the sequence number to a comparison value to determine a relationship between the two. In some examples, the comparison value may be a current value of a counter on the recipient device, or the comparison value may be the current value of the counter on the recipient device as incremented by a predefined sequence interval. If the sequence number is equivalent to the comparison value, then the recipient device can determine that no event datasets have been lost. If the sequence number is different than the comparison value, then the recipient device can determine that one or more data-loss events occurred. A data-loss event occurs when the provider device overwrites an event dataset in the ring buffer prior to the recipient device obtaining the event dataset from the ring buffer. A larger difference between the sequence number and the comparison value can indicate a larger number of data-loss events, while a smaller difference can indicate a smaller number of data-loss events. In some examples, the recipient device can determine how many data-loss events have occurred based on the difference. For example, if the sequence number from the slot is 128 and the determined comparison value is 64, then the difference of 64 between those two numbers may indicate that 64 data-loss events occurred.

In some examples, the recipient device can execute one or more operations in response to detecting a data-loss event. The operations may be configured to reduce future data-loss events. For example, the operations can include adjusting a rate at which the recipient device retrieves event datasets from the ring buffer. The rate may be adjusted to be closer to the rate at which the producer device is adding event datasets to the ring buffer, which may diminish the mismatch between these rates and consequently reduce future data-loss events. As another example, the operations can include increasing a number of slots in the ring buffer, so that the ring buffer can hold more event datasets. This may involve the recipient device directly increasing the number of slots in the ring buffer, or this may involve the recipient device interacting with a remote computing device (e.g., that includes the ring buffer) to cause the remote computing device to increase the number of slots in the ring buffer. With the ring buffer capable of holding more event datasets, the provider device may not need to overwrite event datasets as frequently, which can reduce the number of data-loss events in the future. As yet another example, the recipient device can spawn a new recipient device configured to obtain event datasets from the ring buffer at a different rate or timing interval. This may involve the recipient device directly spawning the new recipient device itself, or this may involve the recipient device interacting with a remote computing device (e.g., an orchestration node) to cause the remote computing device to spawn the new recipient device. With more recipient devices receiving event datasets from the ring buffer, fewer event datasets may be lost by the totality of the recipient devices.

By implementing some or all of the above functionality, some examples of the present disclosure can enable the recipient device to determine if one or more data-loss events have occurred, determine how many data-loss events have occurred, and take corrective action to mitigate data losses in the future. This can avoid the need to throttle the producer device's writes, which in turn can reduce latency and minimize the onus on the producer device, improving system performance. The recipient device can also evaluate the integrity of one or more event datasets that it obtained from the ring buffer, based on how many event datasets were lost due to one or more data-loss events.

Additionally, some examples of the present disclosure can enable the recipient device to wait until a write process is complete before retrieving a corresponding event dataset from a slot. For example, the recipient device can access a slot of the ring buffer and determine if a write-completion indicator is present in the slot. If the write-completion indicator is absent from the slot, it may signal that the write process for the event dataset is not yet complete. So, the recipient device can try again at a later point in time. The recipient device can iterate this process until it detects the write-completion indicator in the slot, after which the recipient device can obtain the corresponding event dataset from the slot. In this way, the recipient device can avoid retrieving an incomplete event dataset.

While the above examples involve a single recipient-device for clarity, it will be appreciated that these concepts can be applied to a system that involves multiple recipient-devices configured to receive event datasets from a single producer device via a single ring buffer. Each recipient device can individually implement some or all of the features described herein, for example to determine the exact number of event datasets it lost in an attempt to keep up with the producer device.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
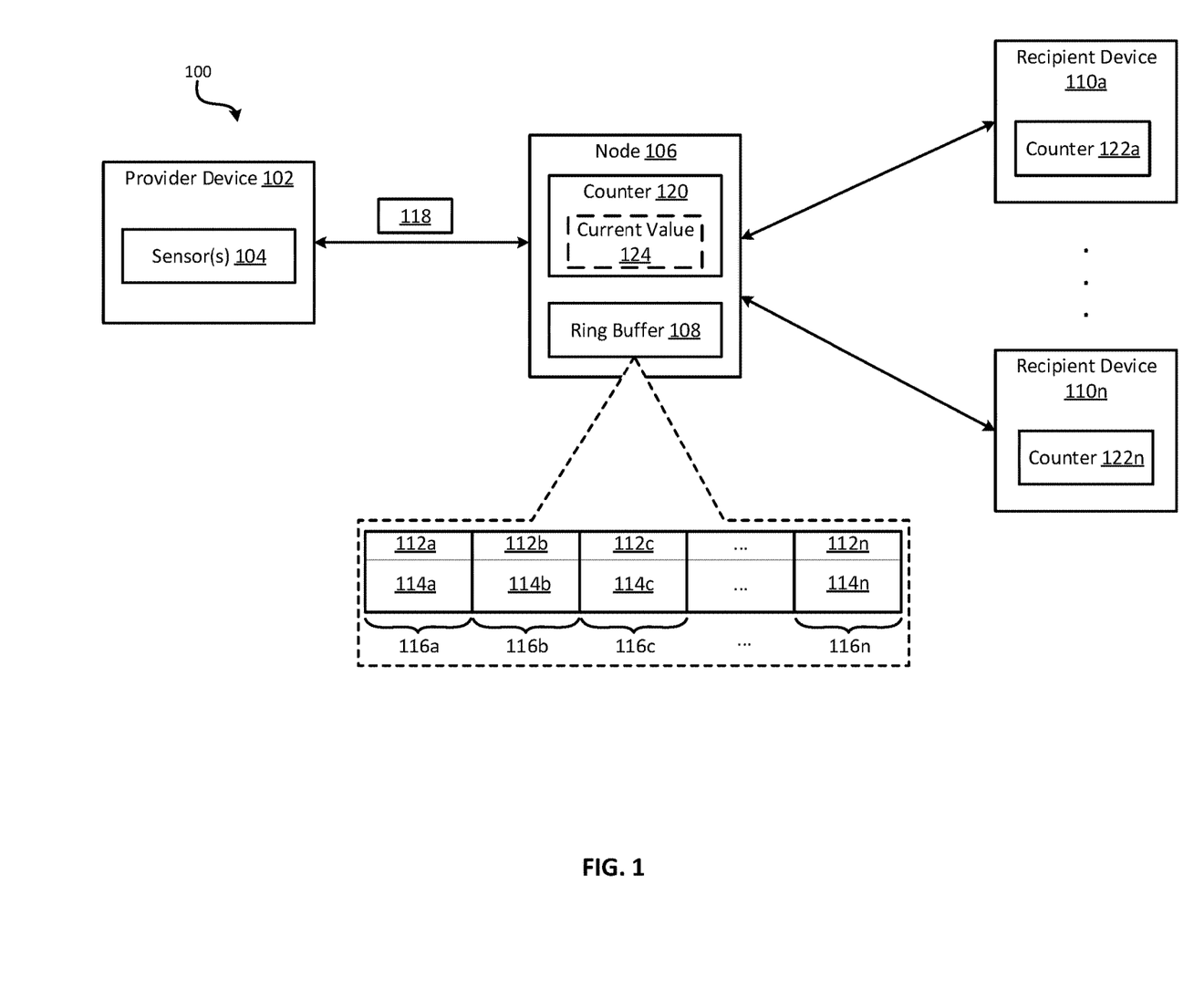
FIG. 1 is a block diagram of an example of a system for detecting and managing losses of event datasets according to some aspects of the present disclosure.

FIG. 1 is a block diagram of a system 100 for detecting and managing losses of event datasets according to some aspects of the present disclosure. The system 100 includes a provider device 102 and one or more recipient devices 110a-n. In general, the provider device 102 can generate one or more event datasets in response to detecting one or more events. The provider device 102 can then convey the event datasets to one or more recipient devices 110a-n via a ring buffer 108, where the recipient devices 110a-n are physically separate from the provider device 102.

The provider device 102 can include any suitable device for generating and writing event datasets to the ring buffer 108. Examples of the provider device 102 can include an IOT device, smart phone, wearable device, tablet, laptop computer, or e-reader. The provider device 102 can detect an event based on sensor signals from one or more sensors 104, which may include accelerometers, gyroscopes, temperature sensors, cameras, microphones, ambient light sensors, infrared sensors, ultrasonic transducers, or any combination of these. In response to detecting the event, the provider device 102 can generate an event dataset. The event dataset may be generated based on the sensor signals, in some examples, and may serve as telemetry data if the system 100 is a telemetry system. After generating the event dataset, the provider device 102 can provide the event dataset to the recipient devices 110a-n by writing the event dataset to the ring buffer 108. This is described in greater detail later on.

The recipient devices 110a-n can include any suitable device for receiving event datasets from the ring buffer 108. For example, the recipient devices 110a-n can include IOT devices, servers, cloud or cluster nodes, desktop computers, or any combination of these. In some examples, the recipient devices 110a-n form part of a distributed computing system, such as a cloud computing system, computing cluster, or data grid. The recipient devices 110a-n can read event datasets from the ring buffer 108 and perform operations based on the event datasets. For example, the recipient devices 110a-n can analyze the event datasets and provide results of the analysis to one or more users of the recipient devices 110a-n.

The ring buffer 108 can be positioned in any suitable location within the system 100. In the example shown in FIG. 1, the ring buffer 108 is part of a node 106, such as an IOT device, server, cloud or cluster node, desktop computer, or any combination of these. The node 106 can be separate from, and serve as an intermediary between, the provider device 102 and the recipient device 110a-n. But in other examples, the ring buffer 108 may be internal to the provider device 102 or one of the recipient devices 110*a-n*. A location of the ring buffer 108 is suitable so long as the provider device 102 can write data to the ring buffer 108 and the recipient devices 110*a-n* can read data from the ring buffer 108. Writing data to the ring buffer 108 can include directly writing the data to the ring buffer 108 or indirectly writing the data to the ring buffer 108, for example, by interacting with a remote computing device (e.g., node 106) for causing the remote computing device to write the data to the ring buffer 108. Reading data from the ring buffer 108 can include directly reading the data from the ring buffer 108 or indirectly reading the data to the ring buffer 108, for example, by interacting with a remote computing device for causing the remote computing device to read the data from the ring buffer 108 and transmit the data to the requesting device. In may be unnecessary for the recipient devices 110*a-n* to be able to write data to the ring buffer 108, and in some examples the recipient devices 110*a-n* may be prevented from writing data to the ring buffer 108.

The ring buffer 108 includes N slots, where N is a fixed number. Each slot may include a first predefined area for storing a sequence number and a second predefined area for storing an event dataset, where the first predefined area is separate from the second predefined area. The first predefined area may have a fixed size, such as 64 bits. This fixed size may be determined based on a maximum allowable size of a sequence number. The second predefined area may also have a fixed size, such as 8 kilobyte (kb). This fixed size may be determined based on a maximum allowable size for an event dataset. In FIG. 1, the N slots are depicted as slots 116*a-n*. Slot 116*a* can include a first predefined area 112*a* for storing a sequence number and a second predefined area 114*a* for storing an event dataset. Slot 116*b* can include a first predefined area 112*b* for storing a sequence number and the second predefined area 114*b* for storing an event dataset. Slot 116*c* can include the first predefined area 112*c* for storing a sequence number and the second predefined area 114*c* for storing an event dataset. And so on.

A ring buffer 108 is a data structure with a fixed number of slots of a predesignated size for storing data items. One example of the predesignated size can be 8.008 kb. Ring buffers have read and write pointers that wrap around to the beginning of the ring buffer after reaching an end point of the ring buffer, giving the ring buffer its "circular" perception despite it being a linear data structure. Each trip around the ring buffer may result in older event-datasets stored in the ring buffer's slots being overwritten with newer event-datasets. While various examples are described herein with respect to a ring buffer, other types of buffers may also be used to implement some aspects of the present disclosure.

The system 100 can work together to write event datasets to, and read event datasets from, the ring buffer 108. For example, in FIG. 1, the provider device 102 can detect an event and responsively generate an event dataset 118 corresponding to the event. The provider device 102 can then attempt to write the event dataset 118 to the ring buffer 108. This may involve transmitting one or more communications to the node 106 for causing the node to write the event dataset 118 to the ring buffer 108. The communication(s) can include commands, such as write commands. The node 106 can receive the communication(s) and responsively determine a slot 116*a* among a group of slots 116*a-n* defining the ring buffer 108 in which to store the event dataset 118. In some examples, the node 106 can determine the slot 116*a* based on a current location of a write pointer associated with the ring buffer 108.

After determining the slot 116*a*, the node 106 can determine a current sequence number to associate with the event dataset 118. The node 106 can determine the current sequence number based on a current value 124 of a counter 120. Although the counter 120 is depicted as part of the node 106 in FIG. 1, in alternative examples the counter 120 can be stored on the provider device 102, which can transmit the current value 124 to the node 106. Either way, the node 106 can determine the current sequence number and write the current sequence number to a first predefined area 112*b* of the slot 116*a*. The counter 120 can then be incremented by a sequence interval. For example, if the current value 124 of the counter 120 is 37 and the sequence interval is one, then the incremented value of the counter 120 would be 38. Alternatively, if the if the current value 124 of the counter 120 is 37 and the sequence interval is three, then the incremented value of the counter 120 would be 40. Any suitable sequence interval can be used, so long as the provider device 102 and the recipient devices 110*a-n* use the same sequence interval.

In addition to writing the current sequence number to the first predefined area 112*b* of the slot 116*a*, the node 106 can also initiate a write process for writing the event dataset 118 to a second predefined area 114*b* of the slot 116*a*. If the write process completes successfully, the node 106 can incorporate a write-completion indicator into the first predefined area 112*b* of the slot 116*a*. In some examples, the write-completion indicator can include the incremented value of the counter 120, which can be the next sequence number in the sequence. In other examples, the write-completion indicator can include a predesignated character, a predesignated string of characters, a predesignated number, a predesignated string of numbers, or any combination of these. The node 106 can append the write-completion indicator to the first predefined area 112*b* of the slot 116*a*, replace the current sequence number in the first predefined area 112*b* of the slot 116*a* with the write-completion indicator, or prepend the write-completion indicator to the first predefined area 112*b* of the slot 116*a*. Regardless of how the write-completion indicator is included in the slot 116*a*, the write-completion indicator can indicate to the recipient devices 110*a-n* that the event dataset 118 is done being written to the ring buffer 108. This can prevent the recipient devices 110*a-n* from receiving an incomplete version of the event dataset 118 from the slot 116*a*.

The recipient devices 110*a-n* can each read from the ring buffer 108 in the sequential order of the ring buffer 108. For example, the recipient device 110*a-n* can first read from slot 116*a*, then slot 116*b*, then slot 116*c*, and so on. The recipient devices 110*a-n* may read from the ring buffer 108 at a different rate from one another. For example, recipient device 110*a* may read from the ring buffer 108 at a faster rate than the recipient device 110*n*. The recipient devices 110*a-n* can also read from the ring buffer 108 at a different rate than the rate at which the provider device 102 writes to the ring buffer 108. These rate mismatches may lead to data-loss events, the impact of which may be reduced by implemented some aspects of the present disclosure.

More specifically, the recipient devices 110*a-n* can include counters 122*a-n*. Each recipient device can maintain its own counter for detecting data-loss events with respect to the recipient device. The recipient devices 110*a-n* can each increment their respective counters 122*a-n* before or after reading an event dataset from a slot of the ring buffer 108. If the provider device 102 and the recipient devices 110*a-n* use the same sequence interval, then there should be little (e.g., a single sequence interval) or no difference between the sequence number written in a slot of the ring buffer 108 and the current value of a recipient device's counter. If a meaningful difference (e.g., more than a single sequence interval) exists between the sequence number in the slot and the current value of the recipient device's counter 122a, it may signal one or more data-loss events. Each recipient device can compare a sequence number in a slot of the ring buffer 108 to a comparison value that is derived from the current value of its counter 122a-n, in order to determine if one or more data-loss events have occurred with respect to the recipient device.

If a recipient device 110a detects one or more data-loss events, the recipient device 110a may execute one or more operations in response. The operations can be configured to reduce future data-loss events with respect to the recipient device 110a (or the system 100). In some examples, the operations can include adjusting a rate at which the recipient device 110a reads from the ring buffer 108. The rate may be adjusted to be closer to the rate at which the provider device 102 is writing to the ring buffer 108, which may diminish the mismatch between these rates and consequently reduce future data-loss events. As another example, the operations can include increasing a number of slots in the ring buffer 108, so that the ring buffer 108 can hold more event datasets. This may involve the recipient device 110a interacting with the node 106 to cause the node 106 to increase the number of slots in the ring buffer 108. With the ring buffer 108 capable of holding more event datasets, the provider device 102 may not need to overwrite event datasets as frequently, which can reduce the number of data-loss events in the future. As yet another example, the recipient device 110a can spawn a new recipient device configured to obtain event datasets from the ring buffer 108. The new recipient device can obtain the event datasets at a different rate or timing interval than the recipient device 110a. With more recipient devices receiving event datasets from the ring buffer 108, fewer event datasets may be lost by the system 100.

In some examples, the recipient devices 110a-n can determine that a write process for the event dataset 118 is complete before receiving the event dataset 118 from a slot 116a of the ring buffer 108. For example, a recipient device 110a can read from the first predefined area 112a of the slot 116a and determine if a write-completion indicator is present therein. If the write-completion indicator is absent, it may signal that the write process for the event dataset 118 is not yet complete. So, the recipient device 110a can implement a polling strategy (e.g., waiting, spinning, or yielding) for causing the recipient device 110a to attempt to obtain the event dataset 118 again from the ring buffer 108 subsequent to a passage of a time period. In one such example, the recipient device 110a can wait for a predefined timespan and, upon the expiration of the predefined timespan, read the data again from the first predefined area 112a of the slot 116a. The recipient device 110a can iterate this process until it detects the write-completion indicator in the first predefined area 112a, after which the recipient device 110a can receive the event dataset 118 from the second predefined area 114a of the slot 116a. By implementing a polling strategy in response to detecting that the write process is incomplete, the recipient device 110a can avoid receiving an incomplete version of the event dataset 118 from the slot 116a. The rest of the recipient devices 110b-n can perform a similar process to avoid receiving incomplete versions of the event dataset 118.

From the perspective of the node 106, the above process can involve the node 106 receiving a first read request from a recipient device 110a prior to the completion of the write process. The first read request can be for obtaining the event dataset 118 from the slot 116a. In response to receiving the first read request, the node can provide a first version of the data in the first predefined area 112a of the slot 116a to the recipient device 110a. The first version of the data may exclude the write-completion indicator. At a later point in time, such as after the expiration of the predefined timespan discussed above, the node 106 can receive a second read request from the recipient device 110a. The second read request can again be for obtaining the event dataset 118 from the slot 116a. In response to receiving the second read request, the node can provide a second version of the data in the first predefined area 112a of the slot 116a to the recipient device 110a. If the second read request is received after the write process is complete, then the second version of the data can include the write-completion indicator. Otherwise, the second version of the data may still exclude the write-completion indicator, and the process may iterate further.

While some of the examples above involve the node 106 performing certain functionality, in other examples some or all of the node's functionality can additionally or alternatively be implemented by the provider device 102. For example, the provider device 102 can include the counter 120, the ring buffer 108, or both of these. And the provider device 102 may write sequence numbers and event datasets to the ring buffer 108, for example without having to communicate with a remote computing device like the node 106 (the node 106 may be absent from the system 100). In still other examples, some or all of the node's functionality can additionally or alternatively be implemented by a recipient device 110a. For example, the recipient device 110a can include the counter 120, the ring buffer 108, or both of these. And the recipient device 110a may read from and write to the ring buffer 108, for example without having to communicate with a remote computing device like the node 106 (the node 106 may be absent from the system 100).

Figure 2:
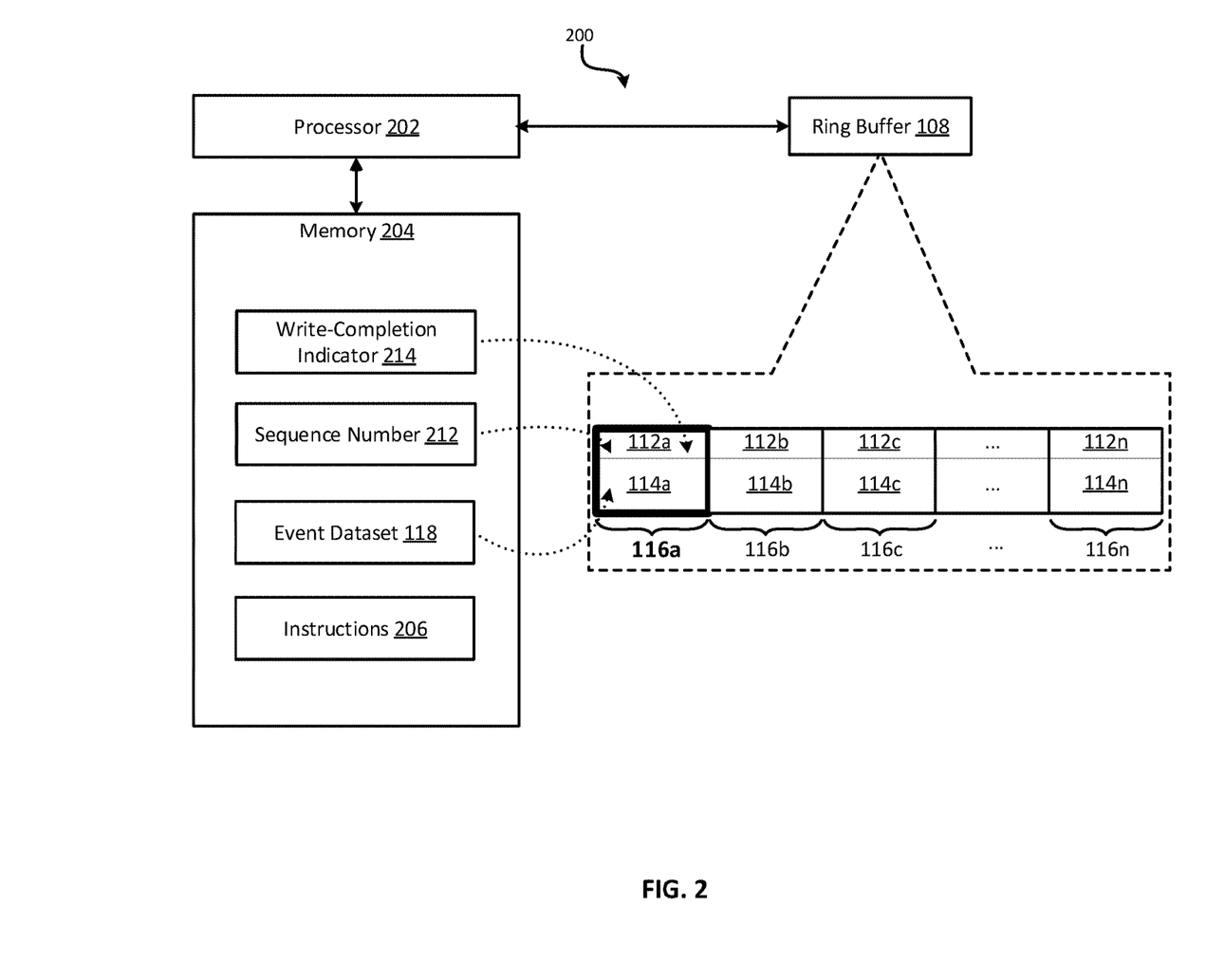
FIG. 2 is a block diagram of another example of a system for detecting and managing losses of event datasets according to some aspects of the present disclosure.

FIG. 2 is a block diagram of another example of a system 200 for detecting and managing losses of event datasets according to some aspects of the present disclosure. Some or all of the system 200 can be disposed in a provider device, a recipient device, or a node, such as the provider device 102, recipient device 110a, or node 106 of FIG. 1, respectively .

The system 200 includes a processor 202 communicatively coupled to a memory 204. The processor 202 can include one processor or multiple processors. Non-limiting examples of the processor 202 include a Field-Programmable Gate Array (FPGA), an application-specific integrated circuit (ASIC), a microprocessor, or any combination of these. The processor 202 can execute instructions 206 stored in the memory 204 to perform operations. In some examples, the instructions 206 can include processor-specific instructions generated by a compiler or an interpreter from code written in any suitable computer-programming language, such as C, C++, C#, or Java.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory device includes a non-transitory computer-readable medium from which the processor 202 can read instructions 206. A non-transitory computer-readable medium can include electronic, optical, magnetic, or other storage devices capable of providing the processor 202 with the instructions 206 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 206.

In some examples, the processor 202 can identify a slot 116a among a plurality of slots 116a-n of a ring buffer 108 in which to store an event dataset 118. The processor 202 can also determine a sequence number 212 to associate with the event dataset 118. The processor 202 can write the sequence number 212 in a first predefined area 112a of the slot 116a of the ring buffer 108, as indicated by a dotted arrow in FIG. 2. The processor 202 can also initiate a write process for writing the event dataset 118 in a second predefined area 114a of the slot 116a of the ring buffer 108, where the second predefined area 114a is separate from the first predefined area 112a. This is also indicated by a dotted arrow in FIG. 2. In some examples, the processor 202 can further detect a completion of the write process. In response to detecting the completion of the write process, the processor 202 can include a write-completion indicator 214 in the first predefined area 112a. This may signal to one or more recipient devices that the event dataset 118 is ready to be read.

It will be appreciated that the system 200 can include additional components, such as a memory controller coupled to the memory 204 and a network interface for communicating with remote computing devices, which are not shown for simplicity.

Figure 3:
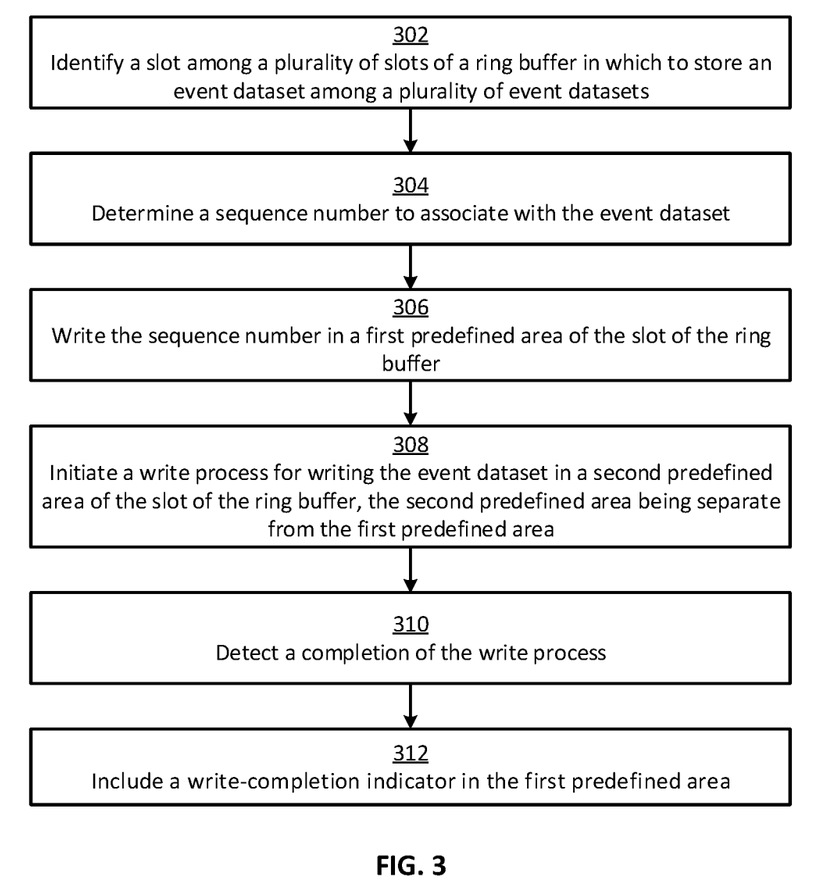
FIG. 3 is a flow chart of an example of a process for writing to a ring buffer according to some aspects of the present disclosure.

FIG. 3 is a flow chart of an example of a process for writing to a ring buffer according to some aspects of the present disclosure. While FIG. 3 depicts a certain sequence of steps for illustrative purposes, other examples can involve more steps, fewer steps, different steps, or a different order of the steps than is depicted in FIG. 3. Further, the steps in FIG. 3 can iterate. The steps of FIG. 3 are described below with reference to components of FIG. 2.

In block 302, the processor 202 identifies a slot 116a among a plurality of slots 116a-n of a ring buffer 108 in which to store an event dataset 118. This may involve referring to a write pointer associated with the ring buffer 108, where the write pointer can indicate the next slot in which data is to be written to the ring buffer 108.

In block 304, the processor 202 determines a sequence number 212 to associate with the event dataset 118. The processor 202 can determine the sequence number 212 based on a current value of a counter, such as counter 120 of FIG. 1. For example, the processor 202 can use the current value of the counter as the sequence number 212. A sequence number that corresponds to the current value of the counter is referred to herein as the current sequence number. A sequence number that corresponds to the next value of the counter is referred to herein as the next sequence number.

In block 306, the processor 202 writes the sequence number 212 in a first predefined area 112a of the slot 116a of the ring buffer 108. This may involve the processor 202 interacting with a memory controller coupled to a memory (e.g., memory 204) storing the ring buffer 108, for example, if the processor 202 and the ring buffer 108 are located on the same physical device. Alternatively, this may involve the processor 202 communicating with a remote computing device for causing the remote computing device to write the sequence number 212 to the ring buffer 108. The remote computing device may include the ring buffer 108.

In some examples, the processor 202 can increment the counter to generate the next sequence number after writing the sequence number 212 to the slot 116a.

In block 308, the processor 202 initiates a write process for writing the event dataset 118 in a second predefined area 114a of the slot 116a of the ring buffer 108, where the second predefined area 114a is separate from the first predefined area 112a. This may involve the processor 202 interacting with a memory controller coupled to a memory storing the ring buffer 108, for example, if the processor 202 and the ring buffer 108 are located on the same physical device. Alternatively, this may involve the processor 202 communicating with a remote computing device for causing the remote computing device to write the event dataset 118 to the ring buffer 108. The remote computing device may include the ring buffer 108.

In block 310, the processor 202 detects a completion of the write process. This may involve the processor 202 interacting with a memory controller coupled to a memory storing the ring buffer 108, for example, if the processor 202 and the ring buffer 108 are located on the same physical device. Alternatively, this may involve the processor 202 receiving a communication from a remote computing device indicating that the write process is complete. The remote computing device may include the ring buffer 108.

In block 312, the processor 202 includes a write-completion indicator 214 in the first predefined area 112a. This may involve the processor 202 interacting with a memory controller coupled to a memory storing the ring buffer 108, for example, if the processor 202 and the ring buffer 108 are located on the same physical device. Alternatively, this may involve the processor 202 communicating with a remote computing device for causing the remote computing device to write the write-completion indicator 214 to the ring buffer 108.

The write-completion indicator 214 can be different from the sequence number 212. For example, the write-completion indicator 214 can be the next sequence number. Alternatively, the write-completion indicator 214 can include a predefined value, such as a predefined alphanumeric string. Either way, the write-completion indicator 214 can signal to one or more recipient devices that the event dataset 118 is ready to be read.

In some examples, the processor 202 can include the write-completion indicator 214 into the first predefined area 112a by overwriting the existing information in the first predefined area 112a with the write-completion indicator 214. Alternatively, the processor 202 can append or prepend the write-completion indicator 214 to the existing information in the first predefined area 112a.

Figure 4:
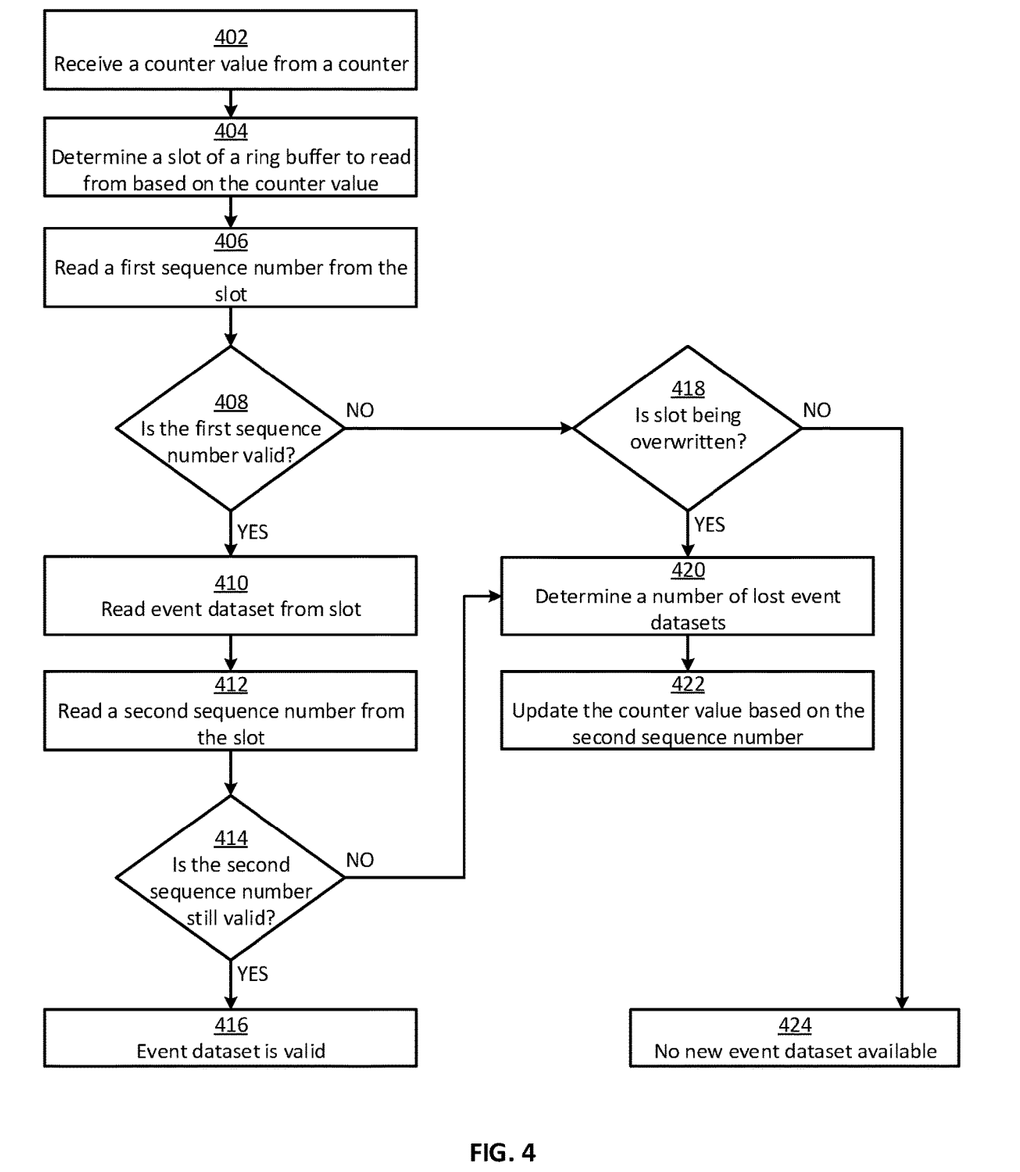
FIG. 4 is a flow chart of an example of a process for reading from a ring buffer according to some aspects of the present disclosure.

FIG. 4 is a flow chart of an example of a process for reading from a ring buffer according to some aspects of the present disclosure. While FIG. 4 depicts a certain sequence of steps for illustrative purposes, other examples can involve more steps, fewer steps, different steps, or a different order of the steps than is depicted in FIG. 4. Further, the steps in FIG. 4 can iterate. The steps of FIG. 4 are described below with reference to components of FIG. 1.

In block 402, a recipient device 110a receives a counter value from a counter 122a. This may involve the processor 202 interacting with a memory controller coupled to a memory storing the counter 122a, for example, if the processor 202 and the counter are located on the same physical device. Alternatively, this may involve the processor 202 communicating with a remote computing device for causing the remote computing device to read the current value of the counter 122a and transmit the current value of the counter 122a to the processor 202. The remote computing device may include the counter 122a.

In block 404, the recipient device 110a determines a slot 116a of a ring buffer 108 to read from based on the counter value. For example, the recipient device 110a can determine the slot based on the following equation: (counter value from counter) mod (ring buffer capacity).

In block 406, the recipient device 110a reads a first sequence number from the determined slot 116a of the ring buffer 108. For example, the recipient device 110a can read the first sequence number from the first predefined area 112a of the slot 116a. An example of the first sequence number can include the sequence number 212 of FIG. 2.

Reading information (e.g., sequence number 212) from the ring buffer 108 may involve the recipient device 110a interacting with a memory controller coupled to a memory storing the ring buffer 108, for example, if the ring buffer 108 is located on the recipient device 110a. Alternatively, reading information from the ring buffer 108 may involve the recipient device 110a communicating with a remote computing device for causing the remote computing device to read the information from the ring buffer 108 and transmit the information to the recipient device 110a. The remote computing device may include the ring buffer 108.

In block 408, the recipient device 110a determines if the first sequence number is valid. This may involve comparing the first sequence number to the counter value to determine a relationship between the two, such as whether they are equivalent to one another. If so, the first sequence number is valid. Otherwise, the first sequence number may be invalid. An invalid sequence number may be indicative of a data-loss event.

If the sequence number 212 is valid, the process can continue to block 410. Otherwise, the process can continue to block 418.

In block 410, the recipient device 110a reads the event dataset 118 from the slot 116a of the ring buffer 108. For example, the recipient device 110a can read the event dataset 118 from the second predefined area 114a of the slot 116a.

In block 412, the recipient device 110a reads a second sequence number from the slot 116a. For example, the recipient device 110a can read the second sequence number from the first predefined area 112a of the slot 116a. The second sequence number may be the same as, or different from, the first sequence number.

In block 414, the recipient device 110a determines if the second sequence number is valid. For example, the recipient device 110a can compare the first sequence number to the second sequence number to determine if there is a difference between the two. If they are the same, then the sequence number 212 is valid. Otherwise, the sequence number is invalid. A difference between the first and second sequence numbers may result from the slot 116a being overwritten during the timeframe in which the recipient device 110a was reading the event dataset, and may be indicative of a data loss event.

If the recipient device 110a determines that the second sequence number is valid, the process can continue to block 416. Otherwise, the process can continue to block 420, which will be discussed later on.

In block 416, the recipient device 110a determines that the event dataset 118 is valid. The recipient device 110a can determine that the event dataset 118 is valid based on determining that the second sequence number is valid. The recipient device 110a may then copy the event dataset 118 into a copy buffer, which can be a buffer that is locally stored on the recipient device 110a for maintaining local copies of event datasets for subsequent use.

As mentioned above, in block 408, the recipient device 110a determines if the first sequence number is valid. If the first sequence number is invalid, then the process can continue to block 418.

In block 418, the recipient device 110a determines if the slot 116a is being overwritten. For example, a provider device may not have written any data yet to the second predefined area 114a of the slot 116a. So, the recipient device 110a can attempt to read the second predefined area 114a of the slot 116a, determine that there the second predefined area 114a of the slot 116a is empty, and consequently determine that the slot 116a is not being overwritten.

If the recipient device 110a determines that the slot 116a is not being overwritten, the process can continue to block 424, in which the recipient device 110a can determine that there is no new event dataset available. If the recipient device 110a determines that the slot 116a is being overwritten, the process can continue to block 420.

In block 420, the recipient device 110a determines a number of lost event datasets. For example, the recipient device 110a can determine a difference between the first sequence number and the counter value. The difference can represent the number of lost event datasets as a result of this iteration of the process. The recipient device 110a can add the difference to an existing value of a loss variable, where the loss variable indicates a total number of data loss events. Each time the recipient device 110a iterates some or all of the process shown in FIG. 4, the recipient device 110a can update the loss variable to maintain a running total of the number of data loss events. In this way, the recipient device 110a can determine how many data-loss events it has experienced.

In block 422, the recipient device 110a updates the counter value based on the second sequence number. For example, the recipient device 110a can update the value of the counter 122a to match the second sequence number. This can enable the recipient device 110a to synchronize its counter 122a with that of the provider device.

Each of the recipient devices 110a-n may individually perform a process similar to the one shown in FIG. 4. This may enable each of the recipient devices 110a-n to, for example, maintain its own running total of the number of data loss events that have occurred with respect to that particular recipient device.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
a processor; and
a memory comprising instructions that are executable by the processor for causing the processor to:
identify a slot among a plurality of slots of a ring buffer in which to store an event dataset;
determine a sequence number to associate with the event dataset, the sequence number being assigned to the event dataset based on a counter value, the counter value being incremented for each event dataset to be stored in the ring buffer;

write the sequence number in a first predefined area of the slot of the ring buffer, the first predefined area being a continuous region in the slot;

initiate a write process for writing the event dataset in a second predefined area of the slot of the ring buffer, the second predefined area being separate from the first predefined area;

detect a completion of the write process; and in response to detecting the completion of the write process, include a write-completion indicator in the first predefined area, the write-completion indicator being different from the sequence number.

2. The system of claim 1, wherein the ring buffer is a data structure having a fixed number of slots of a predesignated size for storing data items, the plurality of slots including the fixed number of slots, each slot in the plurality of slots including two independent areas for separately storing (i) a respective event dataset and (ii) a respective sequence number corresponding to the respective event dataset.

3. The system of claim 1, wherein the event dataset includes telemetry data from an Internet of Things (IOT) device.

4. The system of claim 1, further comprising:

a producer device configured to generate the event dataset; and a recipient device configured to receive the event dataset from the ring buffer, the recipient device being separate from the producer device.

5. The system of claim 4, wherein the processor, the memory, and the ring buffer are disposed in the producer device.

6. The system of claim 4, wherein the processor, the memory, and ring buffer are disposed in a node that is separate from the producer device and the recipient device.

7. The system of claim 4, wherein the memory further comprises instructions that are executable by the processor for causing the processor to allow the recipient device to read data from the ring buffer and prevent the recipient device from writing data to the ring buffer.

8. The system of claim 4, wherein the recipient device is configured to:

receive a counter value from a counter on the recipient device;

receive the sequence number from the first predefined area of the slot;

determine a relationship between the sequence number and the counter value, wherein the relationship is indicative of a data-loss event resulting from an overwrite of at least one event dataset in at least one slot of the ring buffer prior to the recipient device obtaining the sequence number from the first predefined area of the slot; and in response to determining the relationship, execute one or more operations configured to reduce future data-loss events.

9. The system of claim 8, wherein the one or more operations involve:

spawning a new recipient device that is separate from the recipient device and configured to read from the ring buffer; or increasing a rate at which the recipient device is configured to read from the ring buffer.

10. The system of claim 4, wherein the recipient device is configured to:

read the first predefined area of the slot;

determine that the first predefined area of the slot lacks the write-completion indicator based on reading the first predefined area of the slot;

determine that the write process is incomplete based on an absence of the write-completion indicator in the first predefined area of the slot; and in response to detecting that the write process is incomplete, read the first predefined area of the slot again subsequent to a passage of a time period.

11. The system of claim 4, wherein the recipient device is configured to determine a total number of data-loss events occurred during a timespan, the data-loss events being associated with reading event datasets generated by the producer device from the ring buffer.

12. A method comprising:

identifying, by a processor, a slot among a plurality of slots of a ring buffer in which to store an event dataset;

determining, by the processor, a sequence number to associate with the event dataset the sequence number being assigned to the event dataset based on a counter value, the counter value being incremented for each event dataset to be stored in the ring buffer;

writing, by the processor, the sequence number in a first predefined area of the slot of the ring buffer, the first predefined area being a continuous region in the slot;

initiating, by the processor, a write process for writing the event dataset in a second predefined area of the slot of the ring buffer, the second predefined area being separate from the first predefined area;

detecting, by the processor, a completion of the write process; and in response to detecting the completion of the write process, including, by the processor, a write-completion indicator in the first predefined area, the write-completion indicator being different from the sequence number.

13. The method of claim 12, further comprising:

receiving the event dataset from a producer device; and providing the event dataset to a recipient device that is separate from the producer device.

14. The method of claim 13, wherein the processor and the ring buffer are disposed in the producer device.

15. The method of claim 13, further comprising providing the sequence number to the recipient device for causing the recipient device to:

receive a counter value from a counter on the recipient device;

receive the sequence number;

determine a relationship between the sequence number and the counter value, wherein the relationship is indicative of a data-loss event resulting from an overwrite of at least one event dataset in at least one slot of the ring buffer prior to the recipient device obtaining the sequence number from the first predefined area of the slot; and in response to determining the relationship, execute one or more operations configured to reduce future data-loss events.

16. The method of claim 15, wherein the one or more operations involve:

spawning a new recipient device that is separate from the recipient device and configured to read from the ring buffer; or increasing a rate at which the recipient device is configured to read from the ring buffer.

17. The method of claim 12, further comprising:
receiving a first read request from a recipient device prior to the completion of the write process;
in response to receiving the first read request, providing a first version of data from the first predefined area of the slot to the recipient device, the first version of the data excluding the write-completion indicator;
receiving a second read request from the recipient device subsequent to the completion of the write process; and
in response to receiving the second read request, providing a second version of the data from the first predefined area of the slot to the recipient device, the second version of the data including the write-completion indicator.

18. The method of claim 12, wherein the sequence number is a current sequence number and the write-completion indicator is a next sequence number.

19. The method of claim 18, further comprising including the write-completion indicator in the first predefined area by replacing the current sequence number in the first predefined area with the next sequence number.

20. A non-transitory computer-readable medium comprising program code that is executable by a processor for causing the processor to:
identify a slot among a plurality of slots of a ring buffer in which to store an event dataset;
determine a sequence number to associate with the event dataset, the sequence number being assigned to the event dataset based on a counter value, the counter value being incrementable for each event dataset to be stored in the ring buffer;
write the sequence number in a first predefined area of the slot of the ring buffer, the first predefined area being a continuous region in the slot;
initiate a write process for writing the event dataset in a second predefined area of the slot of the ring buffer, the second predefined area being separate from the first predefined area;
detect a completion of the write process; and
in response to detecting the completion of the write process, include a write-completion indicator in the first predefined area, the write-completion indicator being different from the sequence number.

* * * * *